United States Patent
Lewis et al.

(10) Patent No.: US 9,706,010 B2
(45) Date of Patent: *Jul. 11, 2017

(54) SYSTEMS AND METHODS FOR TRIGGERING USER NOTIFICATIONS OF MEDIA CONTENT ITEMS

(71) Applicant: Google Inc., Mountain View, CA (US)

(72) Inventors: Justin Lewis, Marina del Rey, CA (US); Ruxandra Georgiana Paun, Santa Monica, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,021

(22) Filed: Apr. 25, 2016

(65) Prior Publication Data
US 2016/0241677 A1    Aug. 18, 2016

Related U.S. Application Data

(63) Continuation of application No. 13/953,920, filed on Jul. 30, 2013, now Pat. No. 9,326,030.

(51) Int. Cl.
*H04W 4/00* (2009.01)
*H04L 29/08* (2006.01)
(Continued)

(52) U.S. Cl.
CPC ............ *H04L 67/36* (2013.01); *G06Q 30/02* (2013.01); *H04L 43/16* (2013.01); *H04L 51/24* (2013.01);
(Continued)

(58) Field of Classification Search
CPC ......... H04L 43/16; H04L 51/24; H04L 67/36; H04W 4/001; G06Q 30/02; H04N 21/251;
(Continued)

(56) References Cited

U.S. PATENT DOCUMENTS 7,596,797 B1    9/2009    Kapner, III
8,169,916 B1    5/2012    Pai et al.
(Continued)

OTHER PUBLICATIONS

Schulzrinne et al., "Real Time Streaming Protocol (RTSP)", Request for Comments: 2326, Apr. 1998, 93 pages, URL: https://tools.iettorg/html/rfc2326.
(Continued)

*Primary Examiner* — Brian J Gillis
*Assistant Examiner* — Amy Ling
(74) *Attorney, Agent, or Firm* — Lowenstein Sandler LLP (57) ABSTRACT

Implementations of the disclosure describe systems and methods for triggering user notifications of media content items. It is determined that a plurality of media content items has a value of an interest metric exceeding a defined threshold value. The plurality of media content items are represented by a list of media content items compiled based on a pre-defined criterion. The interest metric reflects interest of a user to the plurality of media content items. The plurality of media content items is provided by a content channel that has not been subscribed to by the user. Among the plurality of media content items, a media content item that has not been consumed by the user is selected. A notification is provided to a device employed by the user to notify the user of the media content item.

19 Claims, 6 Drawing Sheets

(51) Int. Cl.
*H04L 12/58* (2006.01)
*H04L 12/26* (2006.01)
*G06Q 30/02* (2012.01)
*H04N 21/466* (2011.01)
*H04N 21/25* (2011.01)
*H04N 21/2665* (2011.01)
*H04N 21/2668* (2011.01)
*H04N 21/488* (2011.01)

(52) U.S. Cl.
CPC ....... *H04N 21/251* (2013.01); *H04N 21/2665* (2013.01); *H04N 21/2668* (2013.01); *H04N 21/4668* (2013.01); *H04N 21/4882* (2013.01); *H04W 4/001* (2013.01)

(58) Field of Classification Search
CPC ........... H04N 21/2665; H04N 21/2668; H04N 21/4668; H04N 21/4882
See application file for complete search history.

(56) References Cited

U.S. PATENT DOCUMENTS

| | | |
|---|---|---|
| 8,825,759 B1 | 9/2014 | Jackson |
| 2005/0193414 A1 | 9/2005 | Horvitz et al. |
| 2005/0251411 A1 | 11/2005 | Ishii et al. |
| 2005/0251675 A1 | 11/2005 | Marcjan et al. |
| 2006/0015745 A1* | 1/2006 | Sukigara ................ G06F 21/33 713/182 |
| 2007/0118608 A1 | 5/2007 | Egli |
| 2007/0124493 A1 | 5/2007 | Fogg |
| 2007/0157220 A1* | 7/2007 | Cordray ................ H04H 60/65 725/9 |
| 2008/0040474 A1 | 2/2008 | Zuckerberg et al. |
| 2008/0172696 A1* | 7/2008 | Furusawa ......... G06F 17/30867 725/46 |
| 2009/0228938 A1 | 9/2009 | White et al. |
| 2009/0248599 A1 | 10/2009 | Hueter et al. |
| 2010/0161756 A1 | 6/2010 | Lewis |
| 2011/0131595 A1 | 6/2011 | Xue et al. |
| 2011/0173212 A1 | 7/2011 | Tuttle et al. |
| 2012/0060100 A1 | 3/2012 | Sherwood et al. |
| 2012/0254303 A1* | 10/2012 | Anbalagan ......... G06Q 30/0241 709/204 |
| 2013/0179252 A1 | 7/2013 | Dong et al. |
| 2013/0204873 A1 | 8/2013 | Vandermolen et al. |
| 2013/0262431 A1* | 10/2013 | Garner ............. G06F 17/30029 707/713 |
| 2013/0275519 A1* | 10/2013 | Nichols ................ G06Q 10/107 709/206 |

OTHER PUBLICATIONS

Schulzrinne et al., "RTP: A Transport Protocol for Real-Time Applications", Request for Comments: 3550, Jul. 2003, 105 pages, URL: https://tools.iettorg/html/rfc3550.

Church, "Progressive Download Versus Streaming", Mar. 31, 2009, 5 pages, URL: https://blog.brightcove.com/en12009/03/progressive-download-versus-streaming.

Wikipedia, "Peer-to-Peer", Jul. 27, 2013, 9 pages, URL: https://web.archive.org/web/201307280427541http://en.wikipedia.org/wiki/Peer-to-peer.

Lewis et al., U.S. Appl. No. 13/860,489, filed Apr. 10, 2013.

International Search Report & Written Opinion for International Application No. PCT/US2014/48743, dated Nov. 25, 2014, 9 pages.

* cited by examiner

SYSTEMS AND METHODS FOR TRIGGERING USER NOTIFICATIONS OF MEDIA CONTENT ITEMS

RELATED APPLICATION

This application is a continuation of U.S. patent application Ser. No. 13/953,920, filed Jul. 30, 2013, which is hereby incorporated by reference in its entirety.

TECHNICAL FIELD

The present disclosure is generally related to content sharing platforms, and is more specifically related to systems and methods for triggering user notifications of media content items.

BACKGROUND

Content sharing platforms render digital content hosting and delivery services to their users, by allowing the users to upload, view and share digital content items. In certain examples, the digital content may comprise media items including audio clips, movie clips, TV clips, and music videos, as well as amateur content such as video blogs, short original videos, pictures, photos, and other multimedia content. Digital content items may be consumed by an end-user while being delivered by a streaming provider over a network (e.g., the Internet). Furthermore, some content sharing platforms may provide live streaming of media, as well as streaming of pre-recorded media content.

SUMMARY

A method for triggering user notifications of media content items is presented. A media content sharing platform may identify a target user for presenting a media content item notification. The media content sharing platform may determine that a plurality of media content items has a value of a user interest metric exceeding a defined threshold value, wherein the plurality of media content items is represented by a list of media content items compiled based on a pre-defined criterion, and wherein the user interest metric reflects the interest of the user to the plurality of media content items. The media content sharing platform may select, among the plurality of media content items, a media content item that has not been accessed by the user. The media content sharing platform may notify the user of the media content item.

Furthermore, computing devices for performing the operations of the above referenced method and computer readable storage media storing instructions causing the computing devices to perform the operations of the above referenced methods are also presented.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for triggering user notifications of media content items. A content sharing platform providing media content hosting and delivery services to its users may employ user notifications for attracting users' attention to certain media content items. In certain implementations, a content sharing platform may provide to the users content subscription services, allowing a user to explicitly request to be notified of certain content items, for example, newly uploaded content items having particular attributes (e.g., belonging to a specified media content channel).

However, a significant portion of user population may choose not to subscribe to any of the media content channels of a content sharing platform, or to subscribe to only some of the media content channels that such users consistently consume. To attract a user's attention to media content items which do not qualify under the user's current subscriptions, a content sharing platform may be programmed to provide user notifications with respect to such media content items. However, such unsolicited notifications may be considered undesirable by some users. To avert the user's adverse reaction, such unsolicited notifications may be directed to a limited subset of media content items which may be of interest to the target user. A user's level of interest to media content items may be estimated based on a user interest metric. In certain implementations, the user interest metric may be based upon the user's content consumption patterns. In one illustrative example, the user interest metric may be provided by a channel affinity score with respect to a particular user.

Various aspects of the above referenced methods and systems are described in details herein below by way of examples, rather than by way of limitation.

Figure 1:
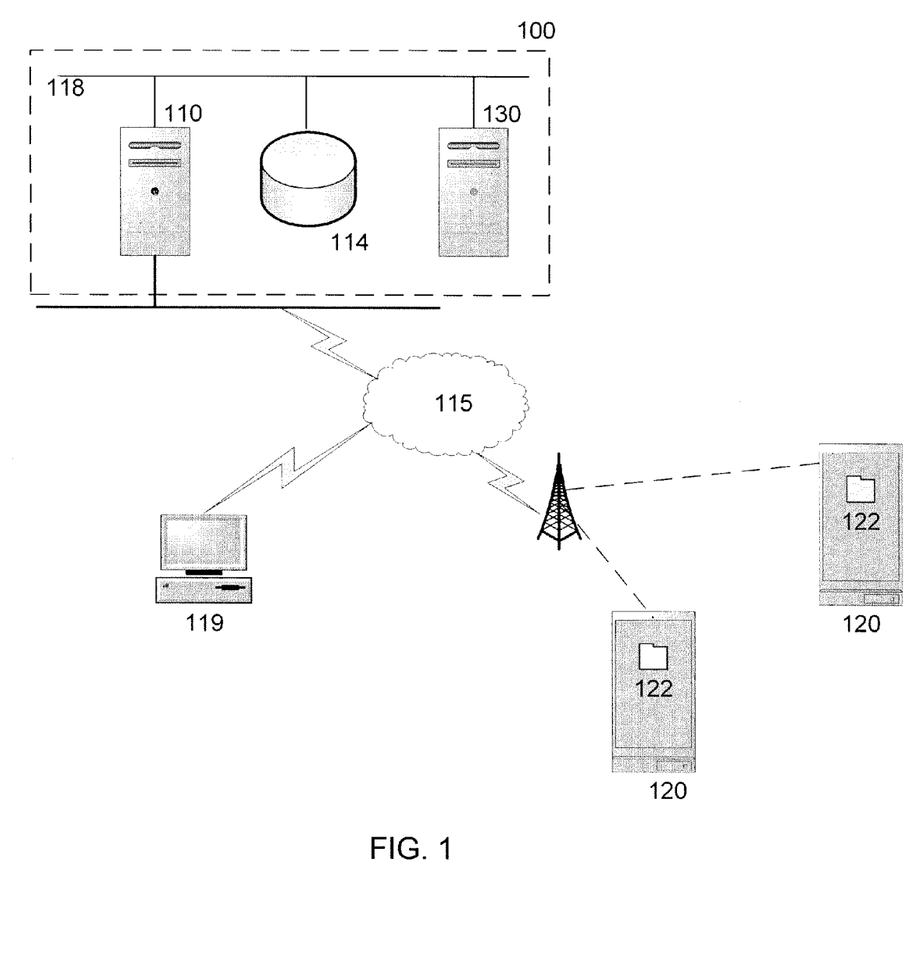
FIG. 1 represents a high-level architectural diagram of a media content sharing platform providing user notifications, in accordance with one or more aspects of the present disclosure.

FIG. 1 represents a high-level architectural diagram of a media content sharing platform providing user notifications in accordance with one or more aspects of the present disclosure. "Content sharing platform" herein shall refer to a computer system rendering media content hosting and delivery services to its users.

The media content sharing platform 100 may include one or more front-end streaming servers 110 coupled to a content data store 114 via a network 118. The network 118 may be provided by a local area network. Other networks, including the Internet, one or more intranets, local area networks (LANs), wide area networks (WANs), and/or virtual private networks (VPNs) may be part of network 118. The content data store 114 may be provided by a local or distributed database, a file repository, or any other data repository of a suitable architecture. The content data store 114 may be employed to store a plurality of media content items (collectively referred to as "content"). In one illustrative example, the content may include one or more items uploaded by users of the media content sharing platform 100 for sharing with other users. Uploaded content items may include data captured and/or transmitted by one or more personal computers 119 and/or mobile computing devices 120 over the network 115.

In certain implementations, the media content sharing platform 100 may further comprise a user notification server 130 employed to generate user notifications as described in more details herein below. Although the front-end server 110, the content data store 114, and the user notification server 130 are depicted in FIG. 1 as separate components, these and other components of the content hosting and delivery platform 100 may be implemented together in a single computing device or in various combinations of multiple different computing devices and systems that may be interconnected over one or more networks, including LANs and/or WANs.

In certain implementations, the content sharing platform 100 may further comprise various components, such as a load balancer (not shown in FIG. 1) which may be employed to dispatch user requests received over the network 115 to two or more front-end servers 110. In certain implementations, the content sharing platform 100 may further comprise a user directory server (not shown in FIG. 1) which may be employed to authenticate users accessing the shared content hosting and delivery platform 100.

Users may access the content stored by content sharing platform 100 via client devices 120 over network 115. In certain implementations, a client device 120 may be provided by a mobile computing device running a mobile application 122 designed to facilitate user's interaction with the content sharing platform 100. "Mobile computing device" herein shall refer to a portable device having a processor, a memory, and at least one communication interface. Examples of mobile computing devices include, without limitation, smart phones, tablet computers, and notebook computers.

Functions of the mobile application 122 may include, e.g., downloading media content items, playing back media content items, uploading media content items to the content sharing platform 100, managing user's subscriptions to activity feeds of content channels of the content sharing platform 100, etc. In order to improve the end user's content consumption experience, the mobile application 122 may buffer the received video and/or audio stream thus allowing end user issue playback control commands, such as pause, stop, rewind, and/or fast forward.

Figure 2:
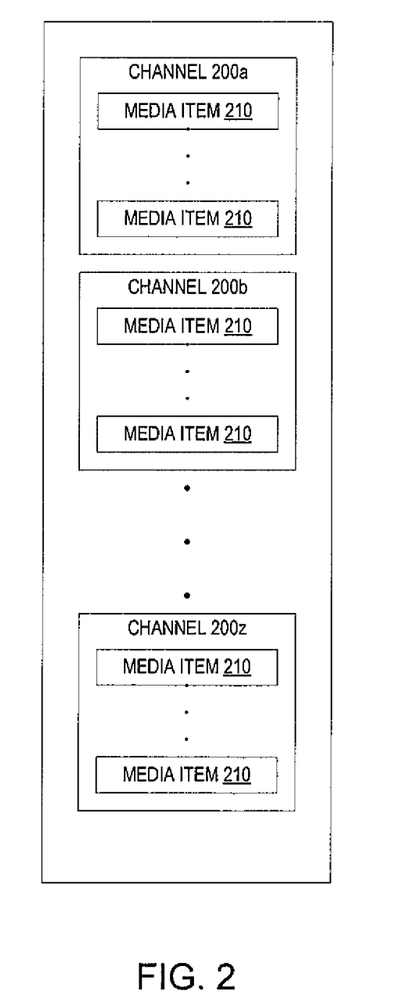
FIG. 2 represents a graphic representation of media content channels, in accordance with one or more aspects of the present disclosure.

The content sharing platform 110 may employ content channels 200a-200z for grouping the hosted media content items, as schematically illustrated by FIG. 2. "Media content channel" herein shall refer to a collection of media content items. In one illustrative example, a media content item may be designated as related to a given media content channel based on a topic or theme of the media content item. In another example, a media content item may be designated as related to a given media content channel based on the source of the media content item. In another example, a media content item may be arbitrarily designated, by an authorized user (e.g., the media content channel owner), as related to a given media content channel. In a further example, a media content item may be designated as related to two or more media content channels. Various users' actions with respect to a media content channel may include uploading new media content items by the content channel owner and/or other users, evaluating (e.g., by "liking" or commenting) media content items, downloading and viewing media content items, etc. An annotated list of certain users' actions with the respect to content items of a media content channel may be referred to as a "channel activity feed."

A media content channel 200 may be represented by a list of media content items 210 identifiable by respective media content item identifiers, as schematically illustrated by FIG. 2. A media content channel may be identified by a media content channel identifier.

The content sharing platform 110 may provide to the users content subscription services, by generating user notifications with respect to certain types of events associated with a particular media content channel, e.g., responsive to the user's request. In one illustrative example, a user may subscribe to the channel activity feed in order to receive notifications of certain actions by other users with respect to a particular media content channel. A combined activity feed may include a list of certain types of events associated with two or more media content channels that a particular user is subscribed to.

To attract a user's attention to media content items which do not qualify under the user's current subscriptions, a content sharing platform may be programmed to provide user notifications with respect to such media content items. To avoid a user's adverse reaction to unsolicited notifications, such notifications may be directed to a limited subset of media content items which may probably interest the target user, as described in more details herein below.

In certain implementations, the content sharing platform 100 may identify one or more target users for presenting one or more unsolicited content item notifications. In one illustrative example, the target users may be those accessing the content sharing platform via a mobile application. In another illustrative example, the target users may be those who have not accessed the content sharing platform for a pre-defined period of time (e.g., 24 hours).

The content sharing platform 100 may further identify a plurality of media content items which might be of a potential interest to the target user. A plurality of media content items may be identified by a list compiled based on one or more pre-defined criteria. A user's level of interest to the list of media content items may be estimated based on a user interest metric. In certain implementations, the user interest metric may be based upon the user's content consumption patterns.

Thus, in one illustrative example, the content sharing platform may identify one or more content channels which have not been subscribed to by the user and which have the value of a channel affinity score exceeding a pre-defined threshold value. In another example, the content sharing platform may identify a content channel which has the maximum, among two or more content channels, value of the channel affinity score.

The channel affinity score for a user may be represented by the ratio of the number of characteristic time periods (e.g., days, weeks, months, etc.) within which the user has accessed the content from the channel to a pre-defined number of the time periods preceding the moment in time when the affinity score is being calculated. In one illustrative example, the channel affinity score for a user may be calculated as the number of weeks within a pre-defined time period (e.g., within the past four weeks) when the user has accessed the content from the channel.

The content sharing platform may select, among the identified content channels, one or more content items to generate user notifications. In certain implementations, the content sharing platform may be programmed to only notify the users of recently created or modified content items.

In one illustrative example, the content sharing platform may select, for generating user notifications, one or more content items having at least a pre-defined number of impressions by other users of the content sharing platform. "Impression" herein shall refer to displaying a visual item to a user. In certain implementations, a visual item being displayed to a user may reference a particular media content item. A single screen may contain multiple visual items (e.g., thumbnails of media content items), and hence displaying the screen to a user would result in one impression for each of the visual items displayed.

In another example, the content sharing platform may select, for generating user notifications, one or more content items having at least a pre-defined number of clicks by other users of the content sharing platform. In a further example, the content sharing platform may select, for generating user notifications, one or more content items having at least a pre-defined click-through rate by other users of the content sharing platform. In a further example, the content sharing platform may select, for generating user notifications, a content item having the maximum, among the video content items of the channel, click-through rate by users of the content sharing platform. "Click-through rate" herein shall refer to the ratio of the number of user's clicking on a visual item to the number of impressions of the visual item.

In a further aspect, the content sharing platform may be programmed to present various types of content notifications to a user, including, e.g., high-priority notifications (such as a pop-up window displayed on the user's device, which may be accompanied by an acoustic notification for attracting user's attention) and low-priority notifications (such as textual items displayed in the notification area of the screen of the user's device). In certain implementations, the content sharing platform may be programmed to present user notifications via the user's device notification functions, even if the mobile application providing user's access to the content sharing platform is not running at the notification time.

In certain implementations, the content sharing platform may be programmed to select a notification type based on the content item parameters, such as the channel affinity score and the click-through rate of the content item. In one illustrative example, the content sharing platform may be programmed to employ high-priority notifications for content items belonging to channels having the channel affinity score exceeding a defined threshold value, and employ low-priority notifications for other content items. In another example, the content sharing platform may be programmed to employ high-priority notifications for content items having click-through rates exceeding a defined threshold value, and employ low-priority notifications for other content items.

In certain implementations, the content sharing platform may be programmed to present the user notifications within a configurable time period, e.g., from 10 am to 9 pm local time for the location of the user's device. Alternatively, the content sharing platform may be programmed to present the user notifications within a time period calculated based on the user's access pattern of the content sharing platform. In one illustrative example, the content sharing platform may be programmed to present the user notifications within a pre-defined time window around the median session start time by the user with respect to the content sharing platform, for a pre-defined number of characteristic time periods (e.g., a 2-hour window around the median session start time for the last 3 days).

In certain implementations, the content sharing platform may be programmed to throttle the user notifications in order to further decrease the probability of a user's adverse reaction to an unsolicited notification. In one illustrative example, the content sharing platform may be configured to evaluate a notification frequency condition before presenting the notification to the user, and cancel the notification if the number of user notifications which have already been presented to the user within a defined time period exceeds a pre-defined notification frequency threshold.

In certain implementations, the content sharing platform may be programmed to start streaming the media content item for pre-fetching by the user's device responsive to detecting that the user has accessed notification of the media content item. Thus, should the user decide to access the media content item, the play-back by the user's device would start immediately responsive to the device's receiving the corresponding user interface command.

As noted herein above, mobile computing device 120 of FIG. 1 may execute a content sharing platform access application 122. In one illustrative example, the content sharing platform access application 122 may be designed to play back media content items received from the content sharing platform 100, in accordance with one or more aspects of the present disclosure. In one illustrative example, the media player application 122 may be implemented as a browser-based application. In certain implementations, the media player application 122 may employ Adobe Flash player plug-in for rendering the video content. In another example, the media player application 122 may utilize built-in multimedia capabilities of a web browser supporting HTML 5 standard.

In one illustrative example, the mobile computing device 120 running a media player application 122 may be capable of playing back audio streams compressed using audio codecs (e.g., MP3, Vorbis or AAC) and/or video streams compressed using video codecs (e.g., H.264 or VP8). In another illustrative example, the mobile computing device may be capable of playing back a combined bit stream (e.g., FLV, WebM, ASF or ISMA) containing encoded audio and video streams.

In certain implementations, the mobile computing device 120 may control the streaming process by issuing control messages (e.g., Real-time Streaming Protocol (RTSP) messages) to the streaming server 110 of FIG. 1. The video stream may be delivered from the streaming server 110 to the mobile computing device 120 using a transport protocol, such as Real-time Transport Protocol (RTP). The mobile computing device 120 may periodically send quality of service (QoS) information to the streaming server 110 using Real-time Transport Control Protocol (RTCP). As an alternative to RTP/RTCP streaming, the mobile computing device 120 may, in certain implementations, employ HTTP progressive download to perform adaptive bitrate streaming.

In certain implementations, the mobile computing device 120 may be a member of a multicast group receiving a multicast stream transmitted by the streaming server 110 to a plurality of recipients 120. Alternatively, the mobile computing device 120 may receive a video stream from one or more peer mobile computing devices 120 using a peer-to-peer (P2P) protocol. One or more fragments of the video stream may be received from each of one or more peer client devices. The video stream may be assembled by the mobile computing device 120 before the playback.

Figure 3:
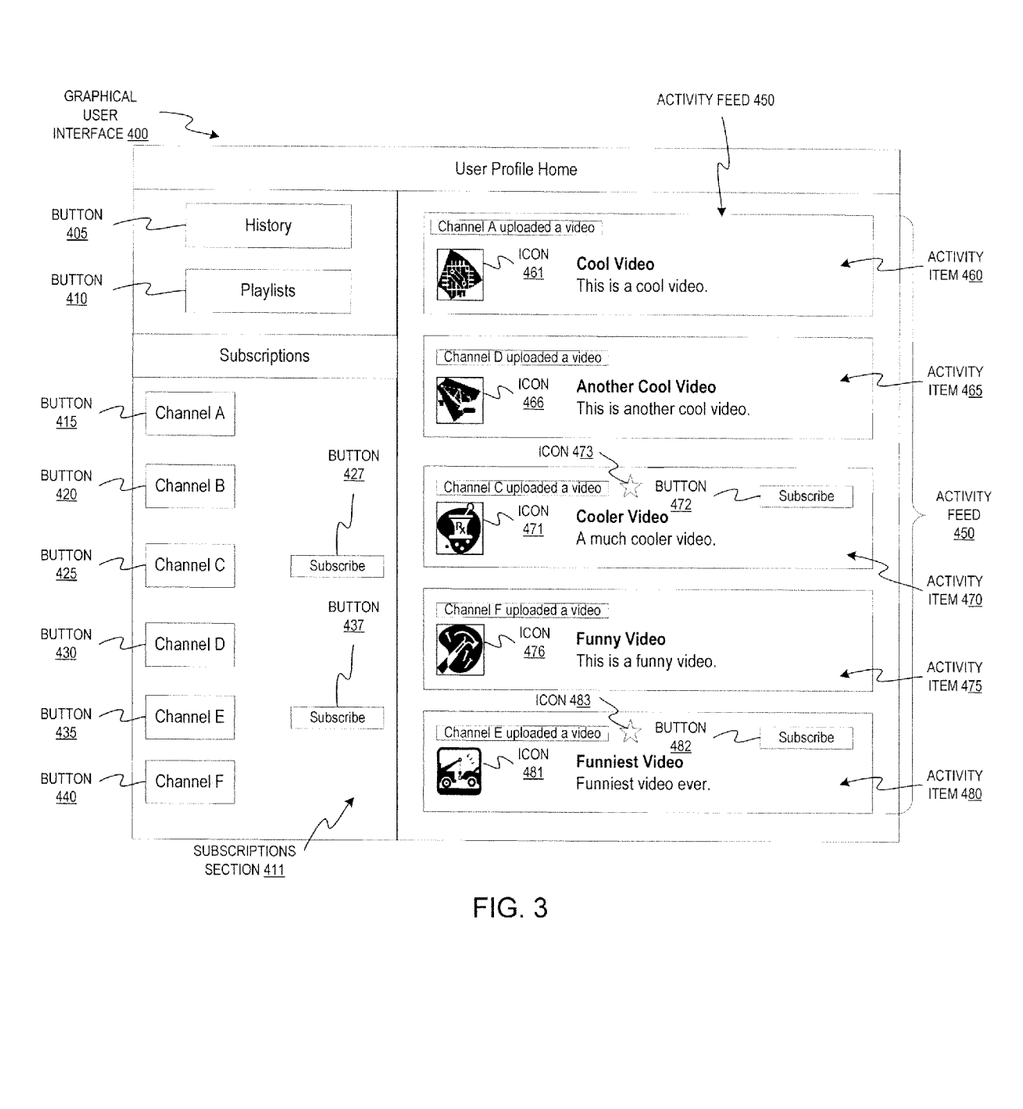
FIGS. 3-4 schematically illustrate examples of graphical user interface (GUI) which may be employed by the mobile computing device accessing the media content sharing platform, in accordance with one or more aspects of the present disclosure.

FIG. 3 schematically illustrates an example graphical user interface (GUI) 400 which may be rendered by the mobile computing device 120 of FIG. 1, in accordance with one or more aspects of the present disclosure. In certain implementations, the GUI 400 may be rendered by the content sharing platform access application 122 of FIG. 1. In one illustrative example, the GUI 400 may be presented within a web browser rendering HTML code provided by the content sharing platform 100. Alternatively, the GUI 400 may be rendered by a media viewer application 122 executable by the mobile computing device 120. Although the GUI 400 is illustrated using buttons (such as buttons 405, 410, 415, etc.), in certain implementations, links and/or other graphical user interface controls or elements may be employed instead of one or more of the buttons.

Button 405 may allow the user to view the history of media items that the user has consumed (e.g., viewed or played). For example, when the user selects and/or activates the button 405, a new GUI that includes a list of the last (e.g., ten, twenty, fifty, or hundred) media items viewed by the user may be presented to the user. The button 410 may allow the user to view different playlists of media items that the user has previously created and/or received. A playlist may be represented by a list of various media items that can consecutively be viewed by the user, e.g., in a sequential or shuffled order. In certain implementations, one or more GUI controls may be designated to accept user input with respect to selecting for playback media items on a playlist.

GUI 400 may further comprise a subscriptions section 411 that includes graphic representations of one or more channels. In one illustrative example, the subscriptions section 411 may display graphic representations of a predefined number of content channels, e.g., the content channels that the user accesses most frequently, the content channels that the user has accessed most recently, or the content channels that the user has most recently subscribed to. In certain implementations, a "subscribe" button 427 or 437 may be displayed adjacent to the buttons representing the content channels not currently subscribed to by the user.

The subscriptions section 411 includes buttons 415, 420, 425, 430, 435, 440 and 440 corresponding to channels A, B, C, D, E, and F respectively. In certain implementations, a list of media items in a content channel may be presented to the user when the user activates a corresponding button for the channel. For example, if the user activates (e.g., clicks on or selects) button 435, the GUI 400 may display a list of videos that are in Channel E. In another example, when a user activates (e.g., clicks, selects, etc.) one of the buttons 415 through 440, a menu may appear on the GUI 400 listing media items associated with the channel corresponding to the activated button. In a further example, when a user activates (e.g., clicks, selects, etc.) one of the buttons 415 through 440, a popup window including a graphic representation (e.g., picture of a single frame from the media item) of media items in the channel associated with the activated button may appear on the GUI 400.

The activity feed 450 can be represented by an annotated list of certain actions with the respect to content items of one or more media content channels. As schematically illustrated by FIG. 3, the activity feed 450 includes activity items 460, 465, 470, 475, and 480. Each activity item may include information about the activity, the title of a corresponding media content item, a description of the media content item, and an icon for the media content item. For example, the activity item 460 includes an informational string reading "Channel A uploaded a video," the title of the video (e.g., Cool Video), a description of the video (e.g., "This is a cool video"), and an icon 461. The icon 461 may be provided by a text, a thumbnail, an image, a frame, and/or other graphical elements used to represent the content media item corresponding to the activity item 160. Icons 466, 471, 476, and 481 are used to represent the media content items (e.g., videos) associated with activity items 465, 470, 475, and 480 respectively. The activity items 470 and 480 also include buttons 472 and 482 allowing the user to subscribe to the channels associated with the activity items 470 and 480. Although in FIG. 3 the activity feed 450 is shown as comprising video content items, it should be understood that in other examples, the activity feed may comprise digital music items, social media items, and/or other types of content items.

Figure 4:
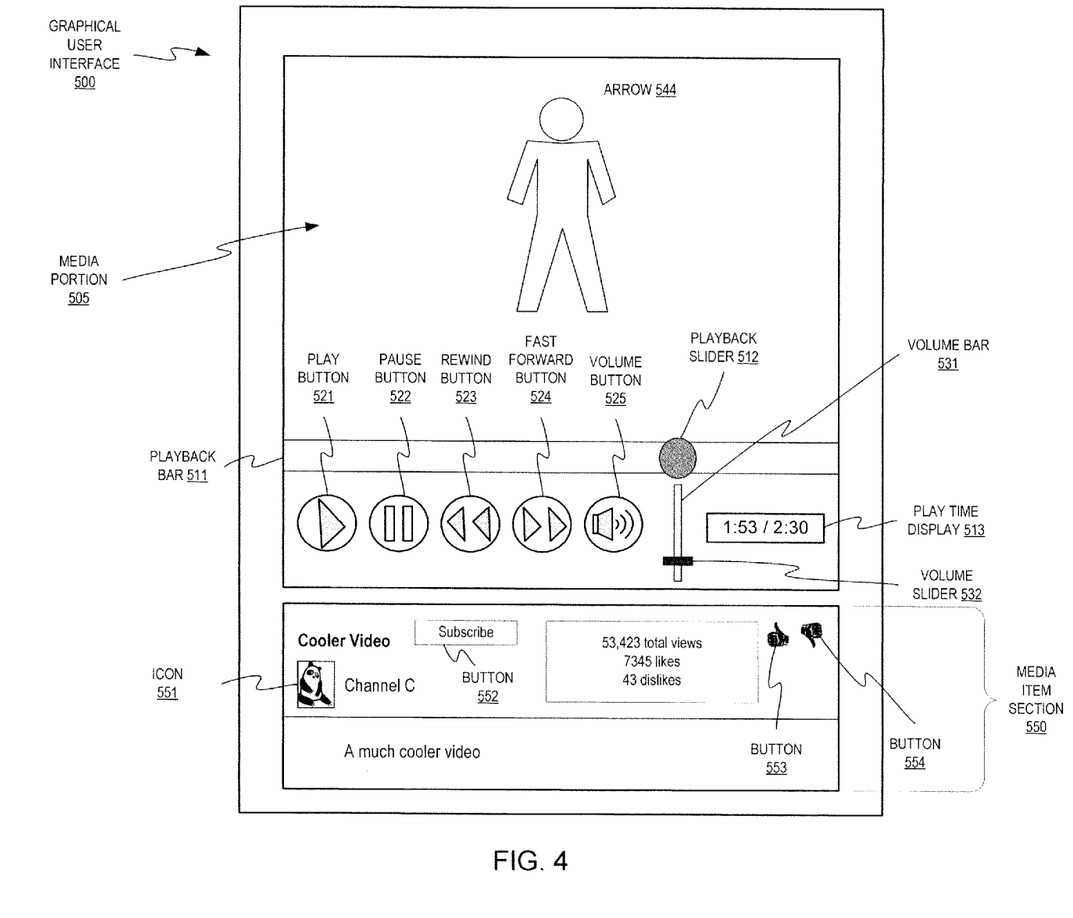

The GUI 500, as schematically illustrated by FIG. 4, may be displayed when the user selects activity item 470 from the activity feed 450 (e.g., when the user selects the video titled "Cooler Video" that was uploaded by channel C). The GUI 500 includes media viewer controls which may be used to control the consumption of the media items (e.g., digital videos and/or digital music). The media viewer controls include a play button 521, a pause button 522, a rewind button 523, a fast forward button 524, and a volume button 525. The play button 521 may allow a user to begin and/or restart playback of the media items. The pause button may allow a user to pause and/or un-pause playback of the media items. The rewind button 523 may allow a user to rewind playback, move and/or skip to an earlier point in time in the media items. The fast forward button 524 may allow a user to fast forward playback, move, and/or skip to a later point in time in the media items. The GUI 500 also includes a play time display 513, a playback bar 511 and a playback slider 512. The play time display 513 may display a current play time and/or a total play time for the media items. For example, a total play time (e.g., the total length) of media item may be 2 minutes and 30 seconds (e.g., 2:30). The current play time may be current time/position in the playback of media item (e.g., 1 minute and 53 seconds or 1:53). Playback slider 512 is positioned on a region of a playback bar 211 that corresponds to the current play time (e.g., 1:53). The playback slider 512 may be adjusted (e.g., dragged) to any other region of the playback bar 511 to adjust the current play time shown in the play time display 213. The GUI 500 includes a media portion 505 that may display a media items. For example, media portion 505 may be the portion of the GUI 500 where a video (e.g., a media item) is played. The media portion 505 may also play other types of videos, images, music, and/or other media items.

The volume button 525 may allow user to control the volume of sounds, music, and/or other audible noises in the videos. In one embodiment, the volume bar 531 and the volume slider 532 may be displayed when the user clicks and/or activates the volume button 525. For example, the volume bar 531 and the volume slider 532 may not be initially displayed in the GUI 500. After the user clicks the volume button 525, the volume bar 531 and the volume slider 532 may be displayed. The user may move and/or slide the volume slider 532 up and/or down along the volume bar 531 to control the volume of sounds, music, and/or other audible noises in the videos. For example, the user may slide the volume slider 532 up to increase the volume or may slide volume slider 532 down to decrease the volume. In one embodiment (not shown in the figures), the GUI 500 may also include buttons (e.g., magnifying glass buttons) that allow a user to zoom in and/or zoom out during the playback of the videos. This may allow a user to get a closer view and/or a farther view of the media item.

The GUI 500 may also include media item section 550. The media item section 550 may include information such as the title, a description, number of approvals from other users (e.g. "likes"), number of dislikes, the channel that the media item belongs to, and total number of views for the media item. The media item section 550 may include information about the video titled "Cooler Video" such as the title, the description (e.g., "A much cooler video"), the channel that the video belongs to (e.g., Channel C), and the number of views (e.g., 53,423), likes (e.g., 7345), and dislikes (e.g., 43) for the video. The media item section 550 may further include an icon 551 that may be used to represent the channel C.

The media item section 550 may further include buttons 552, 553, and 554. Button 552 may allow a user to subscribe to the channel that includes the media item presented in the media portion 505. For example, the button 552 may be used to subscribe to the channel C that includes the video titled "Cooler Video" that is playing in the media portion 505. The button 553 may allow a user to indicate that the user approves of or likes the media item that is playing in the media portion 505. For example, the button 553 may be used to approve of or "like" the video titled "Cooler Video" that is playing in the media portion 505. The button 554 may allow a user to indicate that the user does not like the media item that is playing in the media portion 505. For example, the button 554 may be used "dislike" the video titled "Cooler Video" that is playing in the media portion 505.

Figure 5:
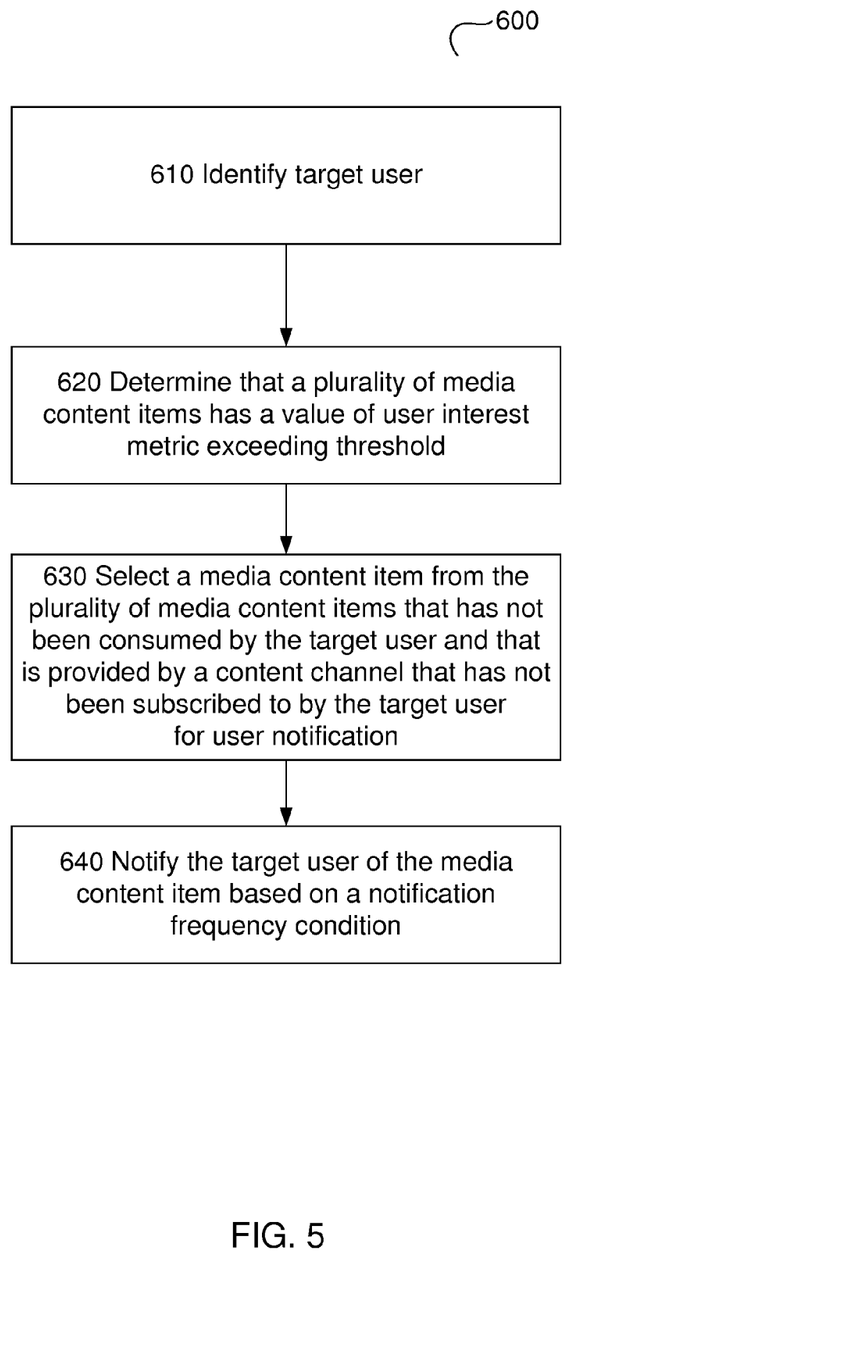
FIG. 5 depicts a flow diagram of one illustrative example of a method for triggering user notifications of media content items by a media content sharing platform, in accordance with one or more aspects of the present disclosure.

FIG. 5 depicts a flow diagram of one illustrative example of a method 600 executable by a media content sharing platform for triggering user notifications of media content items, in accordance with one or more aspects of the present disclosure. The method 600 may be performed by a computer system that may comprise hardware (e.g., circuitry, dedicated logic, and/or programmable logic), software (e.g., instructions executable on a computer system to perform hardware simulation), or a combination thereof. The method 600 and/or each of its individual functions, routines, subroutines, or operations may be performed by one or more physical processors of the computing device executing the method. Two or more functions, routines, subroutines, or operations of the method 600 may be performed in parallel or in an order which may differ from the order described above.

At block 610, a media content sharing platform may identify a target user of the media content sharing platform, for presenting one or more unsolicited content item notifications. In one illustrative example, the content sharing platform may select a user accessing the content sharing platform via a mobile application. In another illustrative example, the content sharing platform may select a user who has not accessed the content sharing platform for a pre-defined period of time (e.g., 24 hours).

At block 620, the media content sharing platform may determine that a plurality of media content items has a value of a user interest metric exceeding a defined threshold value. In certain implementations, the user interest metric may reflect the interest of the user to the plurality of media content items. In one illustrative example, the plurality of media content items may be represented by a media content channel. In a further example, the user interest metric may be provided by a channel affinity score, as described in more details herein above. In one illustrative example, the content sharing platform may identify one or more content channels which have not been subscribed to by the user and which have the value of a channel affinity score exceeding a pre-defined threshold value. In another example, the content sharing platform may identify a content channel which has the maximum, among two or more content channels, value of the channel affinity score.

At block 630, the media content sharing platform may select, among the identified plurality of media content items, a media content item to notify the user of. In certain implementations, the media content sharing platform may select a media content item that has not previously been accessed by the user. In one illustrative example, the media content sharing platform may select a media content item having at least a pre-defined number of impressions by other users of the content sharing platform. In another example, the content sharing platform may select a media content item having at least a pre-defined number of clicks by other users of the content sharing platform. In a further example, the content sharing platform may select A media content item having at least a pre-defined click-through rate by other users of the content sharing platform. In a further example, the content sharing platform may select a media content item having the maximum, among the video content items of the channel, click-through rate by users of the content sharing platform, as described in more details herein above.

At block 640, the media content sharing platform may notify the user of the selected video content item, by providing a notification of a pre-determined or a dynamically selected type, as described in more details herein above. In certain implementations, the content sharing platform may be configured to evaluate a notification frequency condition before presenting the notification to the user, and cancel the notification if the number of user notifications which have already been presented to the user within a defined time period exceeds a pre-defined notification frequency threshold, as described in more details herein above. Responsive to completing the operations referenced by block 640, the method may terminate.

Figure 6:
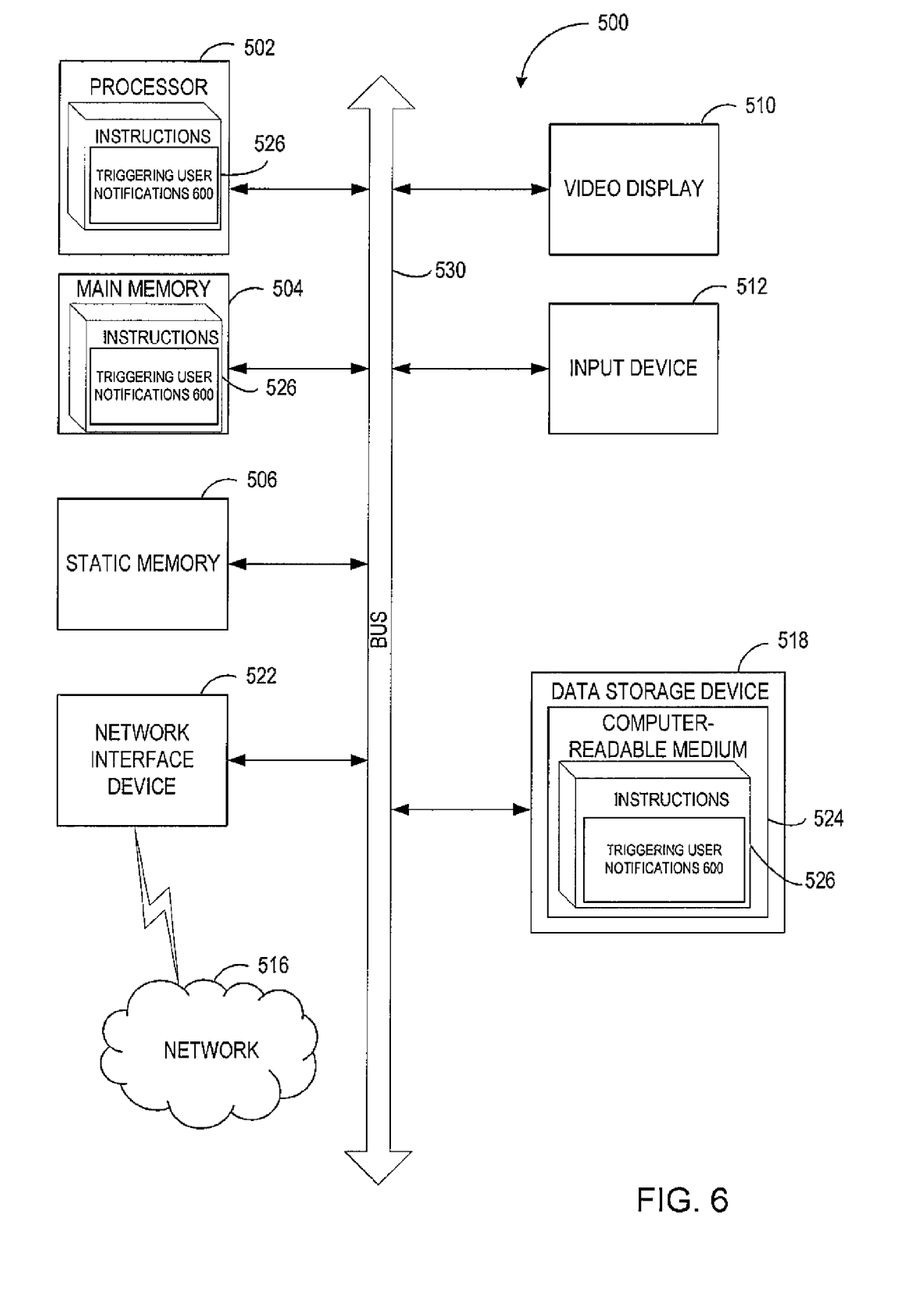
FIG. 6 depicts a block diagram of an illustrative computer system operating in accordance with examples of the present disclosure.

FIG. 6 illustrates a block diagram of an exemplary computer system 500 within which a set of instructions, for causing the computer system to perform the methods discussed herein, including the method 600 for triggering user notifications of media content items, may be executed. In one illustrative example, the front-end streaming server 110, the content store 114, and/or the user notification server 130 of FIG. 1 may be provided by computer systems having the architecture similar to that of the computer system 500, as described herein below. In another illustrative example, the mobile computing device 120 of FIG. 1 may be provided by a computer system having the architecture similar to that of the computer system 500, as described herein below.

The computer system 500 may be connected to other computer system in a LAN, an intranet, an extranet, or the Internet. The computer system 500 may operate in the capacity of a server or a client computer system in client-server network environment, or as a peer computer system in a peer-to-peer (or distributed) network environment. The computer system may be a personal computer (PC), a tablet PC, a set-top box (STB), a Personal Digital Assistant (PDA), a cellular telephone, a web appliance, a server, a network router, switch or bridge, or any computer system capable of executing a set of instructions (sequential or otherwise) that specify actions to be taken by that computer system. Further, while only a single computer system is illustrated, the term "computer system" shall also be taken to include any collection of computer systems that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), and an input device 512 (e.g., a keyboard).

The data storage device 518 may include a computer-readable storage medium 524 on which is stored one or more sets of instructions 526 embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 516 via the network interface device 522.

In certain implementations, the instructions 526 may include instructions for a method of displaying annotated video content, which may correspond to the method 600 of FIG. 5. While the computer-readable storage medium 524 is shown in the example of FIG. 6 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   determining, by a processor, that a plurality of media content items has a value of an interest metric exceeding a defined threshold value, the plurality of media content items represented by a list of media content items compiled based on a criterion, the interest metric reflecting interest of a user to the plurality of media content items, wherein the plurality of media content items is provided by a content channel that has not been subscribed to by the user;
   selecting, by the processor, among the plurality of media content items, a media content item that has not been consumed by the user and that is provided by the content channel that has not been subscribed to by the user; and
   providing a notification to a device employed by the user to notify the user of the media content item based on a notification frequency condition.

2. The method of claim 1, wherein the content channel is associated with a content sharing platform.

3. The method of claim 2, further comprising identifying that the user has not accessed the content sharing platform for at least a defined time period.

4. The method of claim 2, further comprising identifying that the user is associated with employing a mobile application to access the content sharing platform.

5. The method of claim 2, wherein the criterion is provided by one of: a topic of media content items, a source of media content items, or a designation of media content items by an authorized user of the content sharing platform.

6. The method of claim 2, wherein the selecting comprises selecting a media content item having at least one of: a number of impressions by users of the content sharing platform, or a number of clicks by users of the content sharing platform.

7. The method of claim 2, wherein the selecting comprises selecting a media content item having a click-through rate by users of the content sharing platform.

8. The method of claim 2, wherein the selecting comprises selecting a media content item having a maximum, among the plurality of media content items, click-through rate by users of the content sharing platform.

9. The method of claim 2, wherein the providing the notification to the device is performed via user notification functionality of the device to access the content sharing platform.

10. The method of claim 2, wherein the providing the notification is performed while an application providing user access to the content sharing platform is not running.

11. The method of claim 1, wherein the interest metric is determined based on a content consumption pattern of the user.

12. The method of claim 1, wherein the interest metric is provided by a channel affinity score with respect to the user.

13. The method of claim 1, wherein the determining comprises determining that the plurality of media content items has a maximum, among two or more pluralities of media content items, value of the interest metric.

14. The method of claim 1, wherein the selecting comprises selecting a media content item that has been created or modified within a pre-defined time period.

15. The method of claim 1, wherein providing the notification is performed within a defined time of day period.

16. A system comprising:
a memory;
and
a processor, coupled to the memory, to:
determine that a plurality of media content items has a value of an interest metric exceeding a defined threshold value, the interest metric reflecting interest of a user to the plurality of media content items;
select, among the plurality of media content items, a media content item that has not been consumed by the user and that is provided by a content channel that has not been subscribed to by the user; and
provide a notification to a device employed by the user to notify the user of the media content item based on a notification frequency condition.

17. The system of claim 16, wherein the plurality of media content items are represented by a list of media content items compiled based on a criterion and wherein the criterion is provided by one of: a topic of media content items, a source of media content items, or a designation of media content items by an authorized user of a content sharing platform.

18. The system of claim 16, wherein the interest metric is determined based on a content consumption pattern of the user.

19. A non-transitory computer-readable storage medium comprising executable instructions that, when executed by a computer system, cause the computer system to:
identify a plurality of media content items compiled based on a criterion, the plurality of media content items identified as being of interest to a user;
select, among the plurality of media content items, a media content item that has not been consumed by the user and that is provided by a content channel that has not been subscribed to by the user; and
provide a notification to a device employed by the user to notify the user of the media content item based on a notification frequency condition.

* * * * *